March 28, 1967  F. A. VOLPE ETAL  3,311,748
SUN TRACKER WITH ROTATABLE PLANE-PARALLEL
PLATE AND TWO PHOTOCELLS
Filed Dec. 20, 1963  3 Sheets-Sheet 1
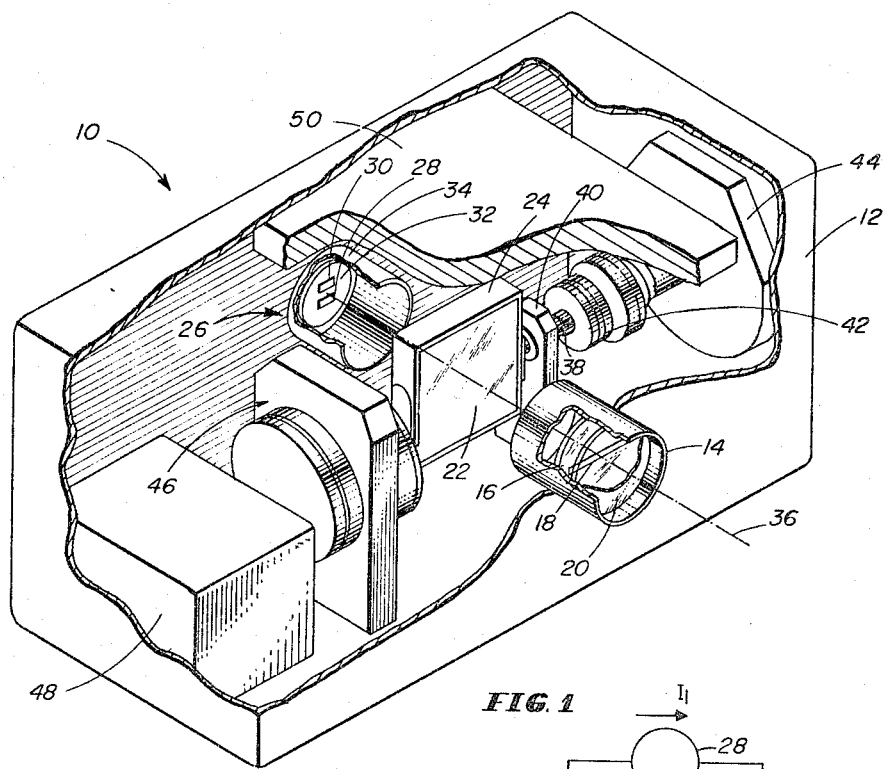
FIG. 1
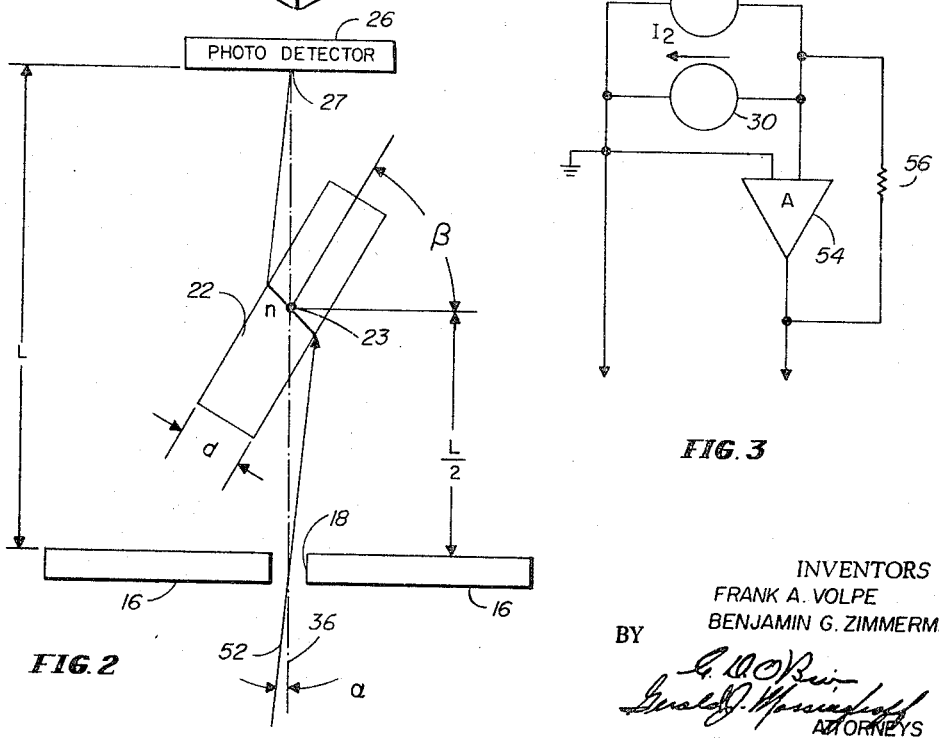
FIG. 2
FIG. 3
INVENTORS
FRANK A. VOLPE
BENJAMIN G. ZIMMERMAN
BY
ATTORNEYS

INVENTORS
FRANK A. VOLPE
BENJAMIN G. ZIMMERMAN
BY

ATTORNEYS

INVENTORS
FRANK A. VOLPE
BENJAMIN G. ZIMMERMAN
BY
ATTORNEYS

United States Patent Office 3,311,748
Patented Mar. 28, 1967

3,311,748
SUN TRACKER WITH ROTATABLE PLANE-PARALLEL PLATE AND TWO PHOTO-CELLS
Frank A. Volpe, Chillum, and Benjamin G. Zimmerman, Forest Heights, Md., assignors to the United States of America as represented by the Administrator of the National Aeronautics and Space Administration
Filed Dec. 20, 1963, Ser. No. 332,313
16 Claims. (Cl. 250—203)

The invention described herein may be manufactured and used by or for the Government of the United States of America for governmental purposes without the payment of any royalties thereon or therefor.

This invention relates to a sun tracker, and more particularly to an optical-electronic system for determining the angle of incidence of solar illumination relative to a preestablished optical axis.

The increasing complexity of proposed space experiments and the high degree of sophistication of present-day space operations have greatly increased the precision and reliability requirements of attitude stabilization systems employed in space vehicles. In scientific satellites such as the orbiting solar observatory type satellites, for example, one of the prime requirements, as well as one of the most critical, is the need for precise static and dynamic attitude orientation of the satellites with respect to the sun's apparent disc, in accordance with received ground commands. This requirement dictates the use of precision sun sensor or tracker apparatus to provide accurate pointing information for the attitude control system, which system, in turn, serves to bring about the command attitude orientation in pitch and yaw.

Various optical sun sensing systems have been proposed to provide this pointing information, that is, to determine or measure the angle of incidence of solar illumination relative to a preestablished optical axis of the satellite. One proposed system employs a plurality of optical wedges which may be rotated to position the sun's image to a predetermined point on a photoelectric detecting device. Another system which has been suggested utilizes a magnetic deflection type image disector tube to provide the necessary tracking function. A third sun sensor which has been proposed includes a photoelectric detecting device which is moved physically to a null position, and the resulting linear movement is measured to provide an indication of the incidence angle of the detected solar energy.

Inherent in each of these proposed systems are disadvantages which render them either partly or wholly unsatisfactory for general application. For example, the rotatable-wedge type system requires excessive frequency response due to the nonlinear optical properties of the wedges, and further requires the use of complex logic to convert wedge angles to useful or meaningful information. Similarly, the magnetic-deflection disector tube approach dictates the use of a disector tube having capabilities beyond the present state-of-the-art, and additionally requires considerable electronics and elaborate magnetic shielding. The third, or moving-detector system, must employ a high precision detector, in combination with a complex linear drive and linear motion pickoff.

The present invention relates to improved sun tracking apparatus which provides a highly accurate measurement of the sun's position relative to a predetermined optical axis. Relatively few moving parts are required to provide this measurement, and only readily available state-of-the-art components are employed.

Accordingly, an object of the present invention is the provision of new and improved sun sensing apparatus which is characterized both by its simplicity and by a high degree of accuracy and increased reliability.

Another object of this invention is to provide a sun sensor wherein the sensor output is easily convertible to usable form.

A further object of the instant invention is the provision of a satellite attitude orientation system which functions with increased efficiency and improved response to insure coincidence between the desired satellite attitude and its actual attitude.

A still further object of the invention is the provision of an optical system for determining the angle of incidence of luminous energy relative to a preselected optical axis, wherein the optical gain properties of the system are employed to relax the accuracy requirements of the optical sensor pickoff.

The foregoing and other significant objects of the invention are attained by the provision of an optical system having a light-responsive detector positioned in light-receiving relationship with a source of luminous energy. This detector has first and second generally coplanar light-sensitive areas positioned on opposite sides of a detector null line. The system further includes a light-refracting optical slab, for example, a plane parallel plate of transparent glass of specified index of refraction and thickness, interposed between the detector and the source of luminous energy for refracting luminous energy passing from the latter to the former. Because of this refracting slab the relative amount of luminous energy impinging on each of the sensitive areas is a function of the orientation of the slab relative to the plane of the detector. Finally included in the system are means for rotating the optical slab relative to the plane of the detector thereby to cause equal amounts of luminous energy to impinge on the light sensitive areas on opposite sides of the detector null line. The result is that the angle between the plane of the optical slab and the plane of the detector is a function of or is proportional to the angle of incidence of the received luminous energy relative to the preestablished optical axis.

As will be explained more thoroughly hereinafter, because of the optical gain properties of the optical slab, the accuracy requirements of the optical sensor pickoff (which in the specific embodiment of the invention illustrated herein comprises a digital encoder responsive to the orientation of the optical slab) may be considerably relaxed. For example, to obtain a 5° field of view, an accuracy of ±2 arc seconds can be achieved with an angle pickoff accurate to ±20 arc seconds.

In its more specific aspects, the invention relates to the optical system outlined above employed in combination with an attitude control which compares the output of the optical system with received ground commands to provide continuous attitude control of the satellite or other space vehicle carrying the system thereby to compensate for incipient variations between the desired satellite attitude and its actual attitude. Preferably, the light-responsive detector and the optical slab are enclosed within a housing having a narrow slit or window which permits the entry of the luminous energy. In such a case, the preestablished optical axis referred to above coincides with a line passing through the detector null line, the optical slab and the narrow window or slit.

A more complete appreciation of the invention and many of the attendant advantages thereof will be readily apparent as the invention becomes better understood by reference to the following detailed description when considered concurrently with the accompanying drawings.

In the drawings in which one of various possible embodiments of the invention is illustrated:

FIGURE 1 is an isometric view, with parts broken away, illustrating one preferred design configuration of a sun tracking system embodying the essential features of the present invention;

FIGURE 2 is a schematic diagram of the optical portion of the FIGURE 1 system;

FIGURE 3 is a circuit diagram illustrating the interconnection of a pair of photo-detector cells employed in the FIGURE 1 system;

Figure 4:
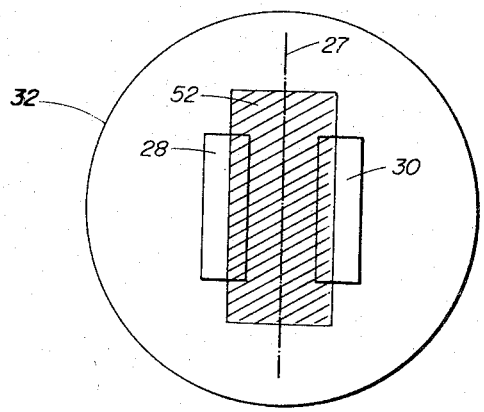
FIGURE 4 is an illustration of the physical positioning of these photo-detector cells.

In order to provide the desired orientation of a space vehicle, for example, in accordance with received ground commands, attitude stabilization with respect to two distinct axes must be attained. Expressed somewhat differently, the attitude control system of a space vehicle must provide the desired orientation both in pitch and in yaw. Since the system disclosed in detail hereinafter provides attitude control, both static and dynamic, with respect to one axis only, it should be understood that two independent control systems, each embodying the essential features of the disclosed system, will normally be required to provide the desired spatial orientation of a space vehicle in pitch and yaw.

With continued reference to the accompanying drawings wherein like numerals designate corresponding parts throughout the various views, and with initial attention directed to FIGURE 1, a sun tracking system 10 constructed in accordance with this invention is illustrated as being housed within a hermetically sealed enclosure 12. The latter is made of a suitable opaque material and serves to isolate the tracking apparatus from ambient or spurious light. Carried through one wall of housing 12 is a cylindrical frame or tube 14 in which is secured an opaque disc 16 having a narrow elongated slit 18 therein. This disc is mounted behind a fused silica window 20. Enclosed within housing 12 and positioned in line with the aperture or window formed by optical slit 18 is an optical slab 22 secured within a frame 24. As explained hereinafter, frame 24 is mounted for rotation or orientation about an axis extending longitudinally of housing 12. Also enclosed within housing 12 and positioned behind optical slab 22 is a light-responsive detector 26 comprising a pair of matched photovoltaic cells 28 and 30 symmetrically spaced on opposite sides of a detector null line. Cells 28 and 30 are electrically insulated from housing 12, and are mounted on a heatsink indicated at 32. The latter serves to minimize temperature-induced parameter differences between the two cells. An opaque cylindrical hood 34 is provided to partially enclose cells 28 and 30, thereby isolating these cells from illumination which might be reflected from components within housing 12.

The optical axis of the FIGURE 1 sun tracker is indicated by the line referenced 36. This axis extends through a point on the detector null line which lies midway between cells 28 and 30, through optical slab 22, and through the longitudinal midpoint of optical slit 18.

Secured to the right side of frame 24 (as viewed in FIGURE 1) is a shaft 38 rotatably supported in a bearing support 40. The end of shaft 38 is secured to one side of a zero-backlash flexible coupling 42, the other side of which is secured to the input shaft of a digital encoder 44 described more fully hereinafter. The left side of frame 24 is secured to the output shaft of a D.C. servomotor system indicated generally by reference numeral 46. The latter may consist, for example, of a conventional motor-tachometer servo drive having suitable operating characteristics; or alternatively, may comprise a suitable inertially damped geared type servo drive. A motor amplifier for the servometer drive is included in housing 12 and indicated by reference numeral 48. Also included in the housing 12 is a digital command system 50 which correlates the output of the sun tracking system with received ground commands to provide appropriate spacecraft pointing signals. This digital command system preferably employs microminiature functional modules in the interest of reduced size, weight and power requirements.

The optical portion of the FIGURE 1 system is illustrated schematically in FIGURE 2; while the electrical interconnection of photocells 28 and 30 is shown in FIGURE 3. Referring first to FIGURE 2 it is seen that the dynamic portion of the optical system consists simply of optical slab 22 having a thickness $d$ and an index of refraction $n$. The axis of rotation of slab 22 (indicated in FIGURE 2 by the point 23) is located a distance $L/2$ from the slit 18 in disc 16 through which solar illumination is permitted to enter housing 12; L being the dimension between disc 16 and the plane of the photo-detector 26. The line corresponding to the rays of the sun entering housing 12 through slit 18 is shown at 52. These rays pass through and are refracted by slab 22, and form a narrow beam or light pattern on the surface of the photo-detector 26. This pattern is shown by the shaded area 52 in FIGURE 4 in the position it assumes under null conditions, i.e., wherein opposite sides of the detector null line (indicated at 27 in FIGURE 4) are equally illuminated. It will be understood that the detector null line 27 (indicated by the point 27 in FIGURE 2) extends midway between the two cells 28 and 30, parallel to slit 18, and in the plane of detector 26 orthogonal to the optical axis 36.

As shown in FIGURE 3, photocells 28 and 30 constitute current sources which are connected in opposed parallel relationship across the input terminals of an operational amplifier 54 having a feedback resistor 56. The output of amplifier 54, which varies as a function of the algebraic sum of current $I_1$ and $I_2$, is applied as a control signal to the input of servomotor amplifier 48 to control the positioning of slab 22. Because of this arrangement, when the center of the light pattern 52 is not coincident with detector null line 27, the light sensitive areas on opposite sides of line 27 do not receive equal amounts of luminous energy and an error signal appears at the output of amplifier 54. This signal is fed to the motor amplifier 48 which in turn controls the servo drive 46 to rotate slab 22 and thereby increase or decrease the slab angle $\beta$ (see FIGURE 2). This increases or decreases the amount of refraction caused by slab 22 to bring about a null condition at the detector 26; i.e., to cause equal amounts of luminous energy to impinge on the light sensitive areas on opposite sides of null line 27. When this null condition has been attained, the sun angle $\alpha$ (the angle of incidence of the received solar illumination relative to optical axis 36) is a precise function of the slab angle $\beta$. This slab angle $\beta$ is sensed by the digital encoder 44 through shaft 38 and is applied in digital form as one input to the digital command system 50. As disclosed more thoroughly hereinafter, this system functions to compare the pointing information of the sun tracker (as represented by the output of encoder 44) with incoming ground command signals and provides an error signal to the space vehicle dynamics to bring about the commanded orientation of the spacecraft.

Figure 5:
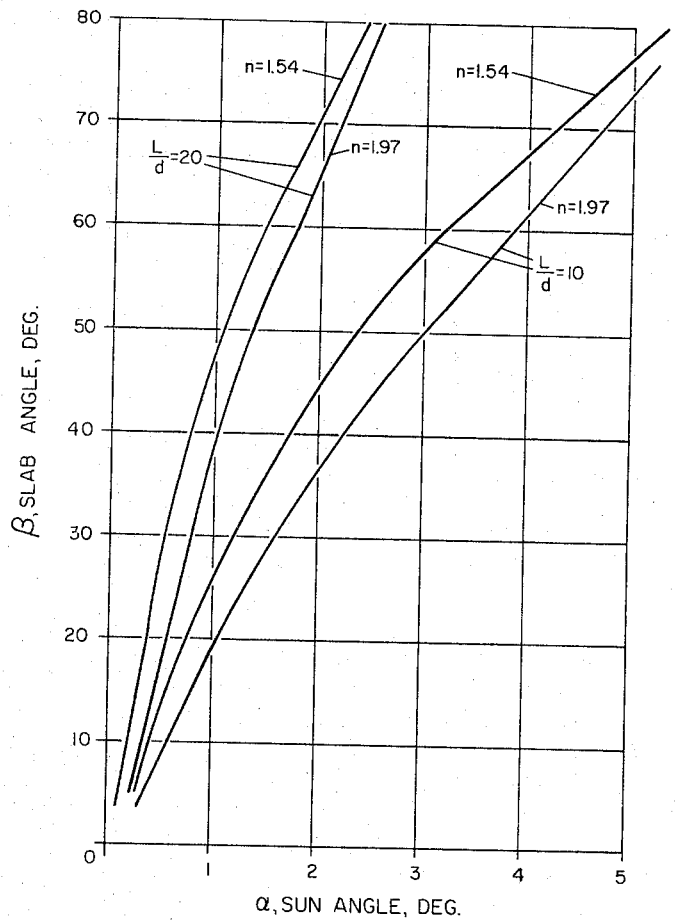
FIGURE 5 is a graph wherein the orientation angle of an optical slab employed in the FIGURE 1 system is shown as a function of the angle of incidence of solar illumination.

The function $\beta = f(\alpha)$ is illustrated in FIGURE 5 for representative values of $L/d$ and index of refraction $n$. It can be seen that the optical gain of the system (as represented by the ratio of slab angle to sun angle $\beta(\alpha)$) is greater for the larger values of $L/d$; however, a typical practical limit of 75 to 80 degrees of slab rotation, coupled with a typical requirement of being able to provide tracking of sun angles of $\pm 5$ degrees, dictates in most cases a maximum practical value of 10 for the $L/d$ ratio. In view of this, and because of the increased linearity of the curve obtained by employing a glass having an index of refraction of $n=1.97$, it will be preferred, again in a typical case, to employ a glass which approximates rather closely the $L/d=10$, $n=1.97$ parameters. In any event, the FIGURE 5 curves serve to demonstate one of the important advantages of the present invention: small variations in the sun angle $\alpha$ are translated to large variations in the slab angle $\beta$. As noted above, this not only increases the inherent sensitivity of the system, it also considerably relaxes the accuracy requirements of the optical sensor pickoff-shaft 38 and encoder 44.

Figure 6:
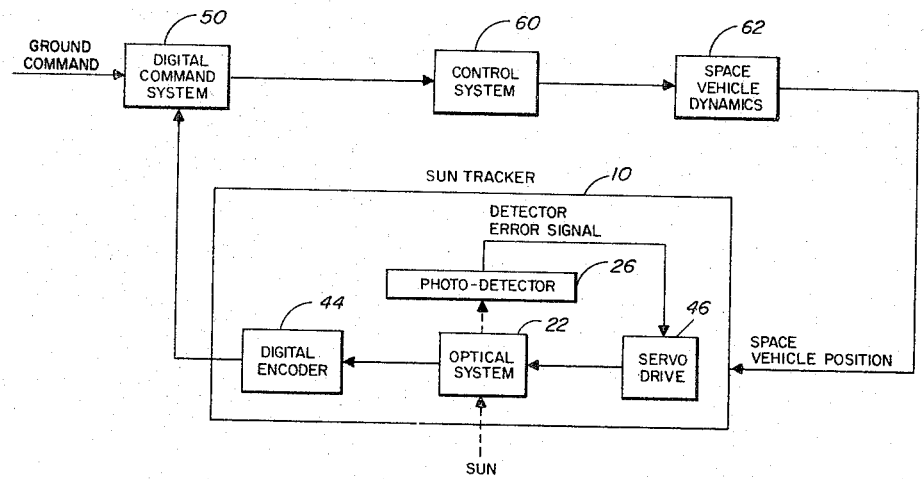
FIGURE 6 is a block diagram showing the major functional components of the FIGURE 1 system and their interconnection.
Figure 7:
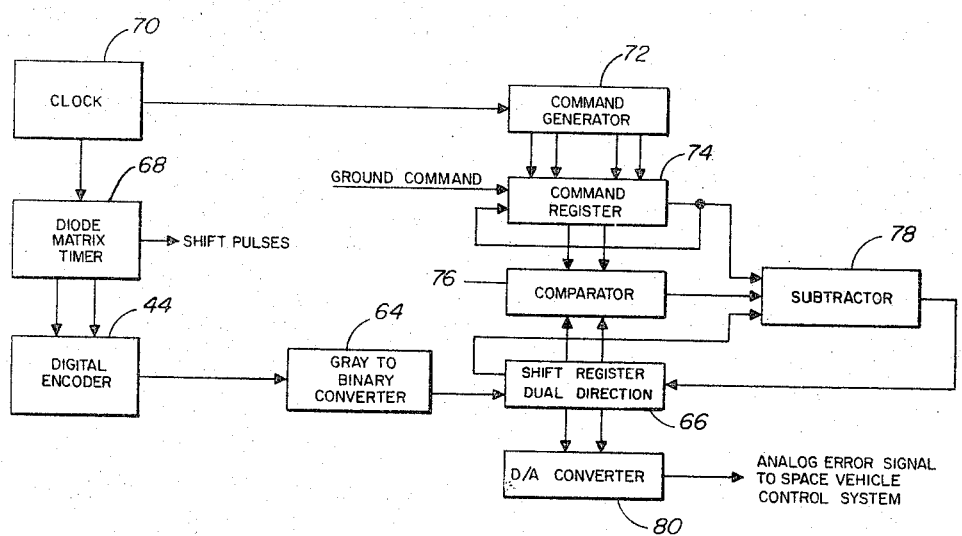
FIGURE 7 is a diagram of the subcomponents of a digital command system employed in the FIGURE 6 system.

The major electronic components of the FIGURE 1 system and their interconnection are shown in block diagram form in FIGURE 6; while the subcomponents of the digital command system are illustrated in FIGURE 7. Referring to FIGURE 6, the sun tracker is indicated at 10 as including the optical slab 22, the photo-detector 26, servo drive 46 and the digital encoder 44. The latter provides an output, for example, in so-called Gray coded form, representative of the slab angle $\beta$. This output (corresponding to a digital measurement of the space vehicle position when the optical slab is orientated to provide a null condition) constitutes one input to command system 50. The other input to system 50 consists of ground command signals indicating in digital form the desired or commanded spacecraft orientation. The digital command system compares the two inputs and provides an error signal in analog form to a control system 60 which may consist, for example, of controllable jets or other reactive control means actuated by suitable electronic or electrical controls. This system by operating on space vehicle dynamics 62, where space vehicle dynamics 62 represents the angular motion of the space vehicle as a function of the output of control system 60, brings about the desired spatial orientation of the space vehicle.

Since the sun tracker 10 is secured to or is a component of the spacecraft, orientation of the latter causes a change in the pointing angle (i.e., the optical axis 36) of the former. This in turn varies the angle of incidence of the solar illumination with respect to optical axis 36, and causes a concurrent change in the output of encoder 44. When the spacecraft assumes the commanded attitude with respect to the received solar illumination, a condition of dynamic balance obtains wherein the output of the sun tracker 10 corresponds to the desired spacecraft orientation as represented by the received ground command signals. In this state the system of FIGURE 6 continuously monitors the spacecraft attitude and provides correcting signals to the spacecraft dynamics to compensate for incipient variations between the desired spacecraft attitude and its actual attitude.

In a sense, the FIGURE 6 system may be thought of as a dual-loop feedback system which includes: (1) an inner loop comprising photo-detector 26, refracting slab 22 and the associated servo drive 46; and (2) an outer loop consisting of sun tracker 10, the digital command system 50, and the space vehicle dynamics 62 and its associated control system 60.

Referring now to FIGURE 7, digital encoder 44 provides its output in Gray coded form to the input of a Gray-to-binary converter 64. The latter provides a binary signal representative of the angle $\beta$ to a dual direction shift register indicated at 66. Encoder 44 is interrogated sequentially by pulses from a diode matrix timer 68 which is in turn controlled by clock pulses from a clock pulse generator 70. The latter also supplies clock pulses to a command generator 72; while shift pulses are applied from timer 68 to shift register 66. The ground command signals representing the desired spacecraft attitude are applied to and stored in a command register 74. When the encoder number has been completely shifted into the shift register 66, it is compared in a comparator 76 with the sun angle stored in command register 74 to establish which of these quantities is larger. This information is needed to determine the sign of the final analog error signal. After this comparison is made, both the command number (the commanded sun angle stored in register 74) and the encoder number (the actual sun angle stored in register 66) are shifted out of their respective registers and serially subtracted in a subtractor 78. The output of this subtractor, corresponding to the difference between command and encoder numbers, is shifted into the shift register 66 behind the encoder number which is being shifted out. When the subtraction is complete and the difference between the command number and the encoder number has been stored in the shift register 66, this difference is gated into a digital-to-analog converter 80 which serves to convert the digital difference to an analog voltage of proper polarity. As explained above in connection with FIGURE 6, this error signal is applied to the spacecraft control system to bring about the commanded spacecraft orientation.

In the foregoing description, it is assumed in the interest of clarity that the attitude control system is functioning in a static or offset pointing mode of operation wherein a preestablished sun angle is applied to and stored in the command register 74. It should be understood, however, that in many applications it may be desired to operate the system in a so-called raster scanning mode wherein the spacecraft is causes to scan sequentially over a predetermined field of view. In this case the sun angle provided at the output of the command register 74 is caused to vary continuously to provide the appropriate analog output to the control system 60. This operation is explained more thoroughly in a paper presented at the Oct. 21–23, 1963 East Coast Conference of the Aeronautics and Navigation Electronics Section of the IEEE (See paper No. 1.5.4, Proceedings of the IEEE ECCANE Conference, Oct. 21, 1963). In either mode of operation, the inherent simplicity and reliability of the FIGURE 1 sun tracker provides accurate pointing information to be processed by the FIGURE 6 control system.

Although the present invention has been described in conjunction with a preferred embodiment thereof, it is to be understood that modifications and variations may be resorted to without departing from the spirit and scope of the invention, as those skilled in the art will readily appreciatae. For example, while the FIGURE 1 sun tracker has been disclosed as being employed in combination with the particular electronic control system of FIGURES 6 and 7, it will be understood that a sun tracker embodying the essential characteristics of the invention could be employed in other environments and with other control systems. Accordingly, it is intended that the foregoing disclosure be construed as illustrative and not in a limiting sense.

What is claimed is:

1. An optical system for determining the angle of incidence of luminous energy relative to a preestablished optical axis, said system comprising:
   a light-responsive detector positioned in light-receiving relationship with a source of luminous energy, said detector comprising first and second light-sensitive areas,
   a light-refracting optical slab interposed between said detector and said source for refracting luminous energy passing from said source to said detector, the relative amount of luminous energy impinging on each of said sensitive areas being a function of the orientation of said slab relative to the plane of said detector, and means for rotating said slab relative to the plane of said detector to cause equal amounts of luminous energy to impinge on each of said light-sensitive areas, whereby the angle between the plane of said slab and the plane of said detector is a function of the angle of incidence of said luminous energy relative to said optical axis.

2. An optical system as set forth in claim 1 wherein said light-responsive detector comprises a pair of generally coplanar photovoltaic cells positioned on opposite sides of a detector null line, and wherein said means for rotating said slab relative to the plane of said detector comprises a motor responsive to the algebraic sum of the respective outputs of said photovoltaic cells.

3. An optical system as set forth in claim 1 wherein said light-refracting optical slab comprises a plane parallel glass plate rotatable about an axis which extends orthogonal to said preestablished optical axis.

4. An optical system as set forth in claim 3 wherein the index of refraction of said glass plate is approximately equal to 1.97, and wherein the distance between the axis of rotation of said plate and the plane of said detector is substantially greater than the thickness of said plate.

5. An optical system as set forth in claim 1, further including:

a digital encoder responsive to the orientation of said optical slab for providing an output signal which varies as a function thereof, and means responsive to said output signal for controlling the orientation of said optical system to bring said preestablished optical axis into coincidence with a predetermined axis.

6. An optical system for determining the angle of incidence of luminous energy relative to a preselected optical axis, said system comprising:

a housing having a window therein for permitting entry of energy radiated from a source of luminous energy, a light responsive detector enclosed with said housing in light-receiving relationship with said source, said detector comprising first and second light-sensitive areas symmetrically positioned on opposite sides of a detector null line, a light-refracting glass plate enclosed with said housing and located along the optical path between said window and said detector, the orientation of said plate with respect to a plane passing through said window and said detector null line establishing the relative amount of luminous energy impinging on each of said light-sensitive areas, and means for rotating said glass plate relative to said plane to cause equal amounts of luminous energy to impinge on each of said light-sensitive areas on opposite sides of said detector null line, whereby the angle between the plane of said plate and the plane passing through said window and said detector null line is a function of the angle of incidence of said luminous energy with respect to said optical axis.

7. An optical system as set forth in claim 6 wherein said window is in the form of an elongated slit, and wherein the axis of rotation of said glass plate, said slit and said detector null line are generally coplanar and extend substantially parallel to one another.

8. An optical system as set forth in claim 7 wherein said light-responsive detector comprises a pair of matched photovoltaic cells positioned symmetrically on opposite sides of said detector null line, and wherein said means for rotating said glass plate comprises a servomotor responsive to the algebraic sum of the respective outputs of said photovoltaic cells.

9. An optical system as set forth in claim 8 wherein the index of refraction of said glass plate is approximately equal to 1.97, and wherein the distance between said window and said light-responsive detector is approximately equal to 10 times the thickness of said glass plate.

10. An optical system as set forth in claim 9, further including:

a digital encoder responsive to the orientation of said glass plate for providing an output signal proportional thereto, and means responsive to said output signal for controlling the orientation of said optical system to bring said preestablished optical axis into coincidence with a predetermined axis.

11. In a space vehicle attitude control system having first means adapted to compare a first signal proportional to the desired orientation of said space vehicle with a second signal proportional to the actual orientation thereof, and second means responsive to the output of said first means for controlling the attitude of said space vehicle to insure coincidence between said desired and said actual orientation; sun tracking apparatus for determining the angle of incidence of solar luminous energy relative to a preestablished axis of said space vehicle, said system comprising:

a light-responsive detector positioned in light-receiving relationship with said solar luminous energy, said detector comprising first and second light-sensitive areas positioned on opposite sides of a detector null line, a light-refracting optical slab refracting said solar luminous energy prior to its impinging on said detector, the relative amount of solar luminous energy impinging on each of said light-sensitive areas being a function of the orientation of said slab relative of the plane of said detector, means for rotating said slab relative to the plane of said detector to cause equal amounts of solar luminous energy to impinge on each of said light-sensitive areas, whereby the angle between the plane of said slab and the plane of said detector is a function of the angle of incidence of said solar luminous energy relative to said preestablished axis, and means responsive to the orientation of said optical slab for providing said second signal to said first means for comparison with said first signal.

12. In a space vehicle attitude control system as set forth in claim 11, said means responsive to the orientation of said optical slab comprising a shaft rotatable with said optical slab, and a digital encoder responsive to the orientation of said shaft for providing said "second signal" in digital form to said first means.

13. In a space vehicle attitude control system as set forth in claim 11, wherein said sun tracking apparatus is enclosed within a housing having a window therein for permitting the entry of solar luminous energy, and wherein the distance between said window and said light-responsive detector is approximately equal to 10 times the thickness of said glass plate.

14. In a space vehicle attitude control system as set forth in claim 13, wherein said optical slab comprises a plane parallel glass plate having an index of refraction approximately equal to 1.97.

15. In a space vehicle attitude control system as set forth in claim 11, wherein said light responsive detector comprises a pair of matched photovoltaic cells positioned on opposite sides of said detector null line, and wherein said means for rotating said optical slab comprises a motor responsive to the algebraic sum of the respective outputs of said photovoltaic cells.

16. In a space vehicle attitude control system as set forth in claim 13, wherein said window is in the form of a narrow elongated slit, and wherein the axis of rotation of said optical slab, said slit and said detector null line are generally coplanar and extend substantially parallel to one another

References Cited by the Examiner

UNITED STATES PATENTS

| | | | |
|---|---|---|---|
| Re. 20,823 | 8/1938 | Goodwin et al. | 250—212 X |
| 2,968,735 | 1/1961 | Kaufold et al. | 250—203 |
| 3,103,651 | 9/1963 | Heinecke et al. | 88—1 |
| 3,161,715 | 12/1964 | Davidson | 88—1 |
| 3,171,963 | 3/1965 | Bourguignon | 250—212 X |
| 3,251,261 | 5/1966 | Lillestrand | 88—1 |

RALPH G. NILSON, *Primary Examiner.*

M. A. LEAVITT, *Assistant Examiner.*